Figure 1:
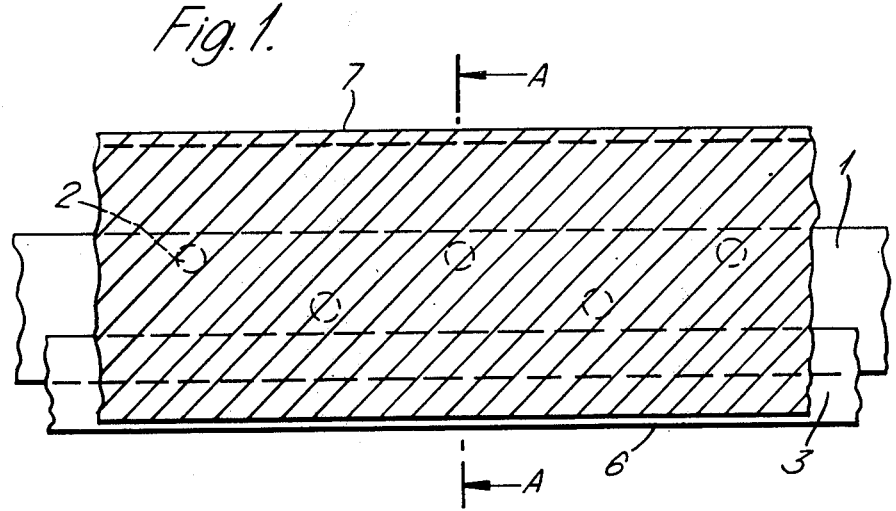

United States Patent [19]
Barrett

[11] 3,983,205
[45] Sept. 28, 1976

[54] METHOD OF MOLDING REINFORCED ARTICLES

[75] Inventor: Joseph Edward Barrett, Twickenham, England

[73] Assignee: The British Petroleum Company Limited, England

[22] Filed: May 16, 1974

[21] Appl. No.: 470,375

Related U.S. Application Data

[63] Continuation of Ser. No. 274,315, July 24, 1972, abandoned.

[30] Foreign Application Priority Data

July 30, 1971   United Kingdom............... 35912/71

[52] U.S. Cl. ............................... 264/254; 264/263; 264/273; 264/274; 264/275
[51] Int. Cl.² ......................................... B29D 3/02
[58] Field of Search .......... 264/263, 273, 275, 277, 264/274, 318, 254

[56] References Cited
UNITED STATES PATENTS

| | | | |
|---|---|---|---|
| 2,684,503 | 7/1954 | Silver | 264/254 |
| 3,395,209 | 7/1968 | Millard | 264/277 |
| 3,559,311 | 2/1971 | Bernier et al. | 264/275 |

FOREIGN PATENTS OR APPLICATIONS

| | | | |
|---|---|---|---|
| 460,370 | 10/1949 | Canada | 264/273 |
| 1,038,336 | 9/1953 | France | 264/250 |

*Primary Examiner*—Robert F. White
*Assistant Examiner*—T. E. Balhoff

[57] ABSTRACT

Grilled flooring and stairways are made by moulding unsaturated polyester D.M.C. round metal reinforcing bars which, during moulding, are located in the mould on a plastics support.

6 Claims, 2 Drawing Figures

METHOD OF MOLDING REINFORCED ARTICLES

This is a continuation of application Ser. No. 274,315 filed July 24, 1972 now abandoned.

The present invention relates to a process for the production of metal reinforced polyester resin articles. In particular it relates to a process for the production of metal reinforced grilled flooring made from polyester resins.

Unsaturated polyesters are well known. They are polyesters which contain a proportion of unsaturated dicarboxylic acid, e.g. maleic or fumaric acid, residues in their structure. They are prepared by interesterification of these dicarboxylic acids, with glycol materials. A proportion of the dicarboxylic acid and of the glycol may be replaced by monofunctional or polyfunctional materials and similarly some of the unsaturated dicarboxylic acid can be replaced by a saturated dicarboxylic acid such as phthalic acid. In order to modify the properties of the cured unsaturated polyester resin one can introduce into the unsaturated polyester isophthalic or carbic acid (endomethylene tetrahydrophthalic acid) residues and also residues derived from chloroacids such as tetrachlorophthalic or HET acid (hexchloroendomethylene tetrahydrophthalic acid) residues. Similarly the conventional glycol materials such as ethylene glycol, propylene glycol, polyethylene glycol and polypropylene glycol can in part or wholly be replaced by Bisphenol A(4,4$^1$-dihydroxy diphenyl propane) adducts of ethylene oxide or propylene oxide.

Normally unsaturated polyesters are copolymerised with a copolymerisable monomer in the production of cured products. The most widely used copolymerisable monomer is styrene, but other monomers such as vinyl toluene and di-allyl phthalate can be employed. Throughout this specification a mixture of an unsaturated polyester with a copolymerisable monomer will be referred to as a polyester resin. Polyester resins normally contain inhibitors e.g. hydroquinone or tertiary butyl catechol, to prevent premature curing and initiator systems e.g. a peroxidic compound, to bring about the copolymerisation reaction when this is desired.

Polyester resins can be employed particularly economically in the form of dough moulding compound (DMC) for the production of articles by a pressure moulding process.

By dough moulding compound is meant throughout this specification a fibre reinforced polyester resin composition containing mineral filler which is adapted for moulding at temperatures in the range 120° to 180°C and at high pressures. Usually the fibre reinforcement is glass fibre, but other fibrous materials such as sisal can be employed. A wide variety of mineral fillers have been employed such as for example non-absorbent powdered mineral fillers such as calcium carbonate, silica and alumina. Generally the total amount of mineral filler including the fibre reinforcement is the predominating part of the dough moulding compound. Pigments, antistatic agents and like materials can be added to the dough moulding compound to improve or modify the properties of the product moulded from the DMC.

It is preferred to employ dough moulding compound which exhibits little shrinkage on moulding. Such dough moulding compounds are described, for example, in British patent specification No. 1,098,132.

However, if attempts are made to operate such a process to produce a metal reinforced article, it is found that it is difficult to locate the reinforcement in the mould during moulding without introducing weaknesses in the final article which may allow the atmosphere to contact the reinforcement and cause corrosion.

An object of the present invention is to provide a process for the production of metal reinforced cured polyester resin articles. A further object is to provide a process which can be used for the production of improved grilled flooring.

Accordingly, the present invention is a process for the production of a metal reinforced polyester resin article which comprises locating a metal reinforcing member within a pressure mould by means of a plastics support having a base designed to rest on the bottom surface of the mould and an upper surface containing means to hold the metal reinforcing member and curing a dough moulding compound, as herein defined, in said mould around the reinforcing member.

In order to ensure a good bond between the reinforcing metal and the cured DMC it is a preferred feature of the present invention to provide indentations in the sides of the metal reinforcement and/or to drill holes through it so that DMC can become keyed to the metal at these points.

The support holds the reinforcing member in position in the mould during the cure of the DMC. Thus with a mould having a flat base, the support base should be wide enough to ensure that the reinforcing member is not seriously displaced in the mould when subjected to the pressures caused by the DMC flowing in the mould just prior to its cure. The support may have side arms, which can be arranged to touch side or rising walls in the mould to increase the stability of the member during cure.

In a preferred aspect of the present invention, the support member is arranged to be positively located in the mould by means of integrally moulded tongues, keys or the like which positively engage with corresponding recesses in the surface of the mould, or by providing a channel in the base of the mould into which the base of the support member fits.

The means in the upper surface of the support by which the reinforcing member is held may take any suitable form. For example, they may consist of a series of projections which fit into corresponding holes in the reinforcing member. Most suitably the upper surface contains a recess into which a part of the metal reinforcing member fits.

When the reinforcing member is a straight strip of metal, the upper surface of the support can contain a groove which fits and holds the member in the support. Such strip reinforcing members may have a series of separate supports along their lengths or may be supported by a single continuous support.

The support is made from a plastics material that is compatible with the DMC and capable of withstanding the temperature and pressures within the mould for sufficient time to locate the reinforcing member during the cure of the DMC. Preferably the support is made from cured unsaturated polyester resin, especially in the form of DMC by any suitable moulding or extruding technique. When a moulding technique is employed it is convenient to mould the support from the chosen plastics material around part of the reinforcing member so as to avoid the separate step of locating the reinforcing member in its support.

In the final moulding stage of the process according to the present invention the supported reinforcing member becomes embedded in a cured dough moulding compound (DMC).

The process of the present invention has the advantage that it can be used to provide metal reinforced polyester resin articles using a relatively economic dough moulding compound procedure as compared with a conventional lay-up procedure. Moreover, the possibility of the metal reinforcement in the final article being in any contact with the surrounding atmosphere is considerably less than it is in similar articles made by moulding DMC around a reinforcing member that has to be supported by projections from the mould walls. Accordingly the process of the present invention is particularly useful in the production of grilled flooring such as that used for cat walks, stairs, landing stages and oil well-head platforms. The disposition and number of metal reinforcing members in the final article will, of course, depend on the final structure that it is desired to produce.

The invention is illustrated with reference to FIGS. 1 and 2 accompanying the specification.

Figure 2:
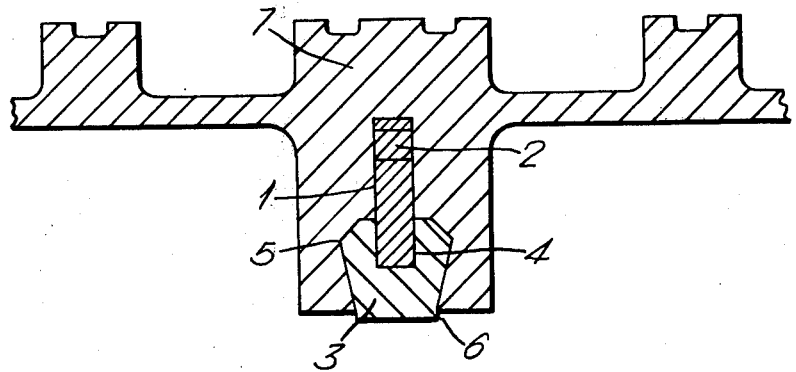

FIGS. 1 and 2 represent respectively a side elevation and a cross-section where indicated A—A of a small part of a steel reinforced DMC grilled flooring unit. The steel reinforcing beam 1, with a plurality of holes 2 drilled through it, was supported during the moulding operation by a support member 3 having a groove 4 into which the steel beam fits. The support member, suitably a DMC extrusion, has a waisted profile 5 to ensure its retention in the moulded DMC product and a shaped base 6 adapted to engage in grooves in the bottom of the mould during the moulding process in which the reinforcing beam 1 is totally encapsulated in DMC 7 to form the grilled flooring unit.

The unit may be prepared by first extruding from DMC the support member 3 with the profile shown. These support members are then fitted to the steel reinforcing beams 1, optionally with the use of an unsaturated polyester or other suitable adhesives. Preferably each support member 3 can be moulded around its steel reinforcing beam 1 from DMC in a mould having a groove in one surface into which the beam fits to the appropriate depth.

The shaped base 6 of the support member 3 which is attached to the reinforcing beam 1 is then engaged in a corresponding slot in the base of the matched metal mould, a charge of DMC is placed in the mould, and the mould closed to a pressure of the order of 100 tons at 120 to 180°C.

The DMC flows around the steel beam, through the holes 2, thereby firmly locking it into the matrix, and around the support member, bonding securely thereto as it cures, and totally encapsulating the steel beam. When the finished beam is removed from the mould, the shaped base of the support member can either be left projecting from the grilled flooring or removed, e.g. by grinding, without exposing the steel beam to the surface. It should be noted that even if the curing DMC does not bond securely to the support member in the moulding process, the shape of the support member shown in the drawings is such that any path formed between the DMC and the support member is relatively long and therefore the chances of ingress of water to the reinforcing beam which might cause it to rust and lose strength are relatively slight.

I claim:

1. A process for the production of a metal reinforced polyester resin article which comprises locating a metal reinforcing member longitudinally within the mould cavity of a longitudinally extending pressure mould by means of at least one plastics support, said mould cavity having a channel in the bottom surface thereof, each plastics support having a base resting in the channel of the mould cavity of the mould, sides spaced from the longitudinal walls of the mould cavity, said sides providing a waisted profile, and an upper surface containing a recess into which part of the metal reinforcing member fits, whereby the metal reinforcing member is spaced from said bottom surface, and curing a fibre-reinforced polyester resin composition containing mineral filler in said mould cavity around the metal reinforcing member to surround said metal reinforcing member with plastics material, whereby any path formed between the plastics support and the cured polyester resin composition is relatively long, thereby minimizing ingress of water to the reinforcing member along said path.

2. A process as claimed in claim 1 wherein the reinforcing metal member has indentations or holes drilled in it so that the fibre-reinforced polyester resin can become keyed to the metal at these points.

3. A process as claimed in claim 1, wherein the metal reinforcing member is a straight strip of metal and the plastics support is a single continuous support having a groove in its upper surface adapted to fit and hold said reinforcing member.

4. A process as claimed in claim 1, wherein the plastics support is made from fibre-reinforced polyester resin composition containing mineral filler 5. A process as claimed in claim 1, wherein the plastics support is made by moulding the plastics material around part of the reinforcing member.

6. A process for production of metal reinforced grilled polyester resin flooring, which comprises locating a longitudinally extending metal reinforcing member longitudinally within each of a plurality of parallel sections of a longitudinally extending pressure mould by means of at least one plastics support, said mould cavity having a channel in the bottom surface thereof, each plastics support having a base resting in the channel of the mould cavity of the mould, sides spaced from the longitudinal walls of the mould cavity, said sides providing a waisted profile, and an upper surface containing a recess into which part of the metal reinforcing member fits, whereby the metal reinforcing member is spaced from said bottom surface and curing a fibre-reinforced polyester resin composition containing mineral filler in said mould cavities around the metal reinforcing members to surround said metal reinforcing members with plastics material, whereby any path formed between the plastics support and the cured polyester resin composition is relatively long, thereby minimizing ingress of water to the reinforcing members along said path.

* * * * *